Aug. 20, 1929.  L. B. GUMP  1,725,266

FASTENING DEVICE

Filed Sept. 28, 1927

Leonard B. Gump
INVENTOR.

BY
ATTORNEYS.

Patented Aug. 20, 1929.

1,725,266

UNITED STATES PATENT OFFICE.

LEONARD B. GUMP, OF GARY, INDIANA.

FASTENING DEVICE.

Application filed September 28, 1927. Serial No. 222,592.

My invention relates to fastening devices, and more particularly to such of these as are employed for connecting members extended in longitudinal succession, and my principal object is to provide a device which serves the purpose without the use of threaded bolts or securing nuts.

A further object of the invention is to provide an aligning element as a part of the novel fastening device to hold the members in place.

Another object of the invention is to incorporate in the same a simple dowel connection, which prevents relative motion of the members.

A final but nevertheless important object of the invention is to construct the novel fastening device with a minimum of parts which are rugged and may be inexpensively produced and assembled.

With the above objects in view and any others that may suggest themselves from the specification and claims to follow, a better understanding of the invention may be gained by reference to the accompanying drawing, in which—

Figure 1:
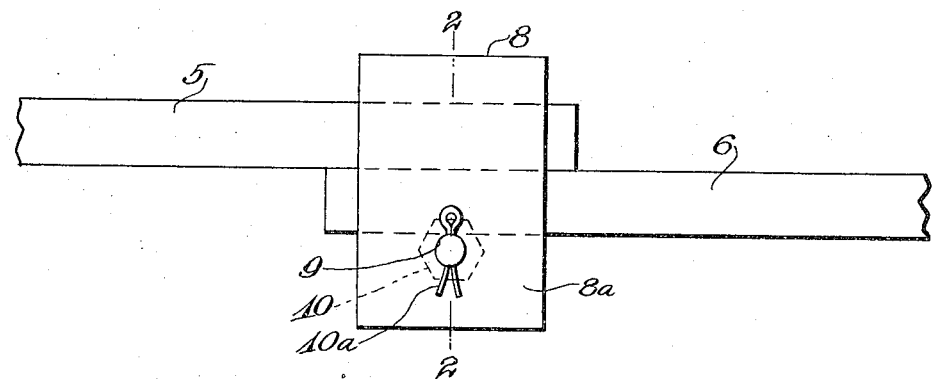
Figure 1 is an elevation of the novel fastening device as applied.
Figure 2:
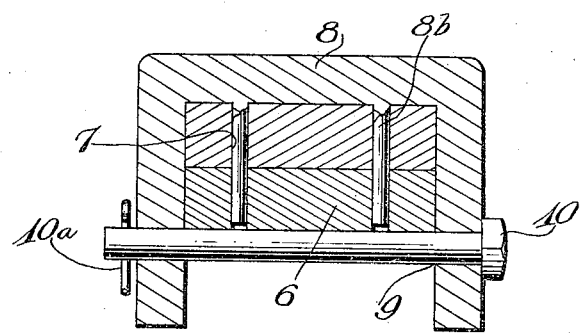
Fig. 2 is a section on the line 2—2 of Figure 1.

Referring specifically to the drawing, 5 and 6 denote two longitudinal members designed to be joined in lineal overlapping succession. Ordinarily, the meeting ends of the members would be applied in overlapped relation and secured by bolts and nuts. While this means of fastening is usually satisfactory, some installations require that a fastening device be employed which is easily taken apart and which is not subject to wear or injury by corrosion. Also, in some cases, a bolt-and-nut fastening suffers from vibration and requires adjustment; and occasionally the nut becomes loose or lost, making the fastening insecure. To eliminate the above deficiencies my novel fastening device accomplishes the objects contemplated above in an efficient manner, and serves satisfactorily for long periods. As in the previous case, the members 5 and 6 are assembled with their ends in superposed or overlapped relation, and two transversely spaced holes 7 are drilled therethrough. The main member of the novel fastening device consists of a U-shaped clip 8 whose sides $8^a$ are spaced corresponding to the width of the members 5 and 6. The clip is applied to the latter by straddling the same, as clearly shown in Figure 2, the sides $8^a$ extending a short distance below the member 6. The main section 8 of the clip has two depending dowels $8^b$ at positions corresponding to the bores 7, and when the clip is lowered upon the assembled members 5 and 6 the dowels $8^b$ slidingly enter these bores, anchoring the members to one another. Immediately below the assembled members, the sides $8^a$ of the clip are bored as indicated at 9 to receive a plain bolt 10. The shank of the bolt terminates a short distance beyond the clip, and receives a cotter pin or key 11 to prevent the retraction thereof. The bolt thus serves as a retainer for the clip to keep the same from rising off the assembled members. It will be seen that a simple structure is had for the purpose outlined, as but three pieces are employed, namely, the clip with its dowels, the bolt, and the retainer for the same. Yet, the clip serves to hold the members in proper assembly, the dowel serve to anchor the same against relative motion, and the bolt to hold the clip down. The device requires no machine work, and can therefore be produced quickly and cheaply; also, its application is extremely simple, and it does not become worn or jammed with use of exposure as in the case of threads in a bolt-and-nut assembly. Further, nicety in dimensions or fit is not essential, and the device may therefore be made by ordinarily methods and without expensive or accurate tools. Due to its few parts, the device should cost but little to produce, and should be capable of use over long periods.

I claim:—

A fastening device for bodies assembled in superposed relation and having spaced alined bores, including a U-shaped clip having pins spaced from the clip arms and formed integrally with and extending from the inner base thereof, said pins being adapted to be positioned through said alined bores in said bodies, a bolt extending through the arms of said clip to hold said bodies within the same, and means for locking said bolt in fixed position through said arms.

In testimony whereof I affix my signature.

LEONARD B. GUMP.